United States Patent [19]
Wildey

[11] 4,167,960
[45] Sep. 18, 1979

[54] RAIL-RIDING LIMBER AND TOPPER

[75] Inventor: Allan J. Wildey, Brantford, Canada

[73] Assignee: Koehring Canada Limited, Brantford, Canada

[21] Appl. No.: 867,940

[22] Filed: Jan. 9, 1978

[51] Int. Cl.² ................. A01G 23/08; B27L 1/00
[52] U.S. Cl. .................................. 144/2 Z; 83/600; 144/309 AC
[58] Field of Search ............ 83/600; 144/2 Z, 3 D, 144/34 R, 34 E, 309 AC

[56] References Cited
FOREIGN PATENT DOCUMENTS

| | | | |
|---|---|---|---|
| 830811 | 12/1969 | Canada | 144/3 D |
| 920920 | 2/1973 | Canada | 144/3 D |
| 950328 | 7/1974 | Canada | 144/2 Z |

Primary Examiner—Robert L. Spruill
Assistant Examiner—W. D. Bray
Attorney, Agent, or Firm—Sim & McBurney

[57] ABSTRACT

In an apparatus for de-limbing trees, there is provided a carriage moving longitudinally on a rail, and having a pair of de-limbing arms adjacent one end which are mounted for pivoting movement with respect to the carriage. Each arm defines a concavity adapted to pivot into contact with a tree held in an upper recess in the carriage, and there are means for urging the arms against the tree. Each arm has a first cutting edge along the forward margin and a second cutting edge along the rearward margin, the first cutting edge being offset inwardly with respect to the second, such that the first cutting edge after passing forwardly beyond the stump of a tree limb which it has severed, can shift inwardly to lie against the tree trunk so that the next cut is made as close as possible to the trunk.

5 Claims, 11 Drawing Figures

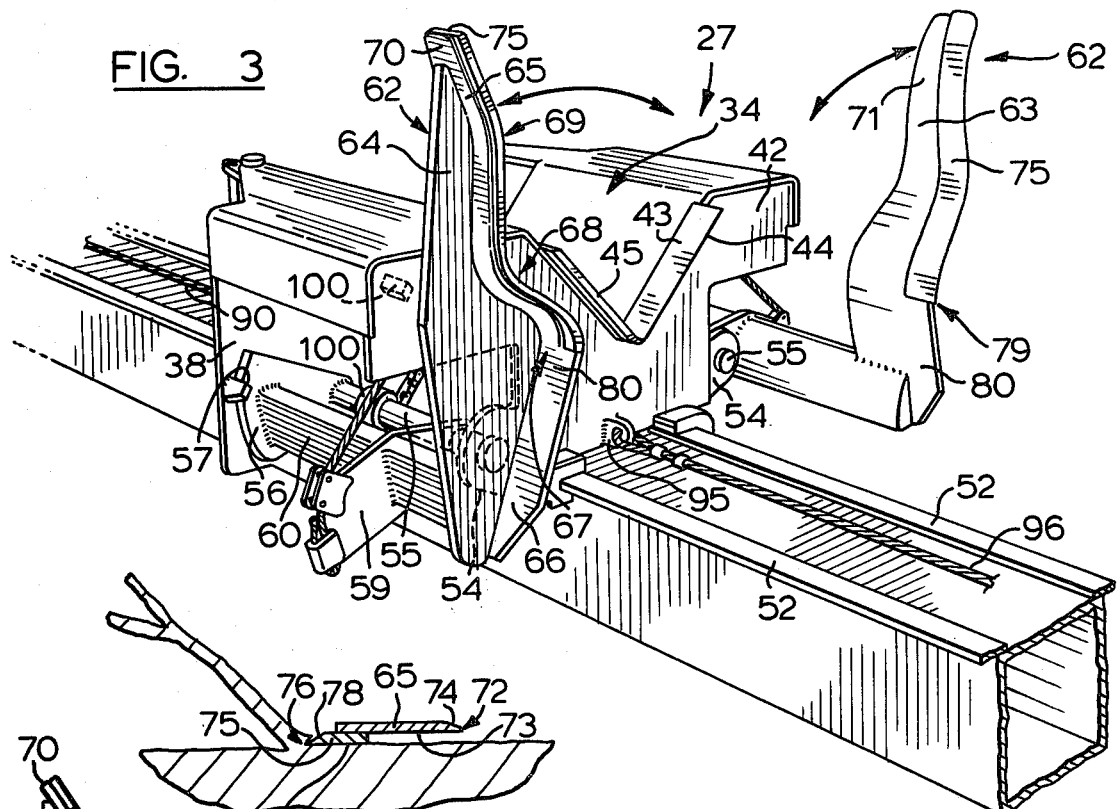
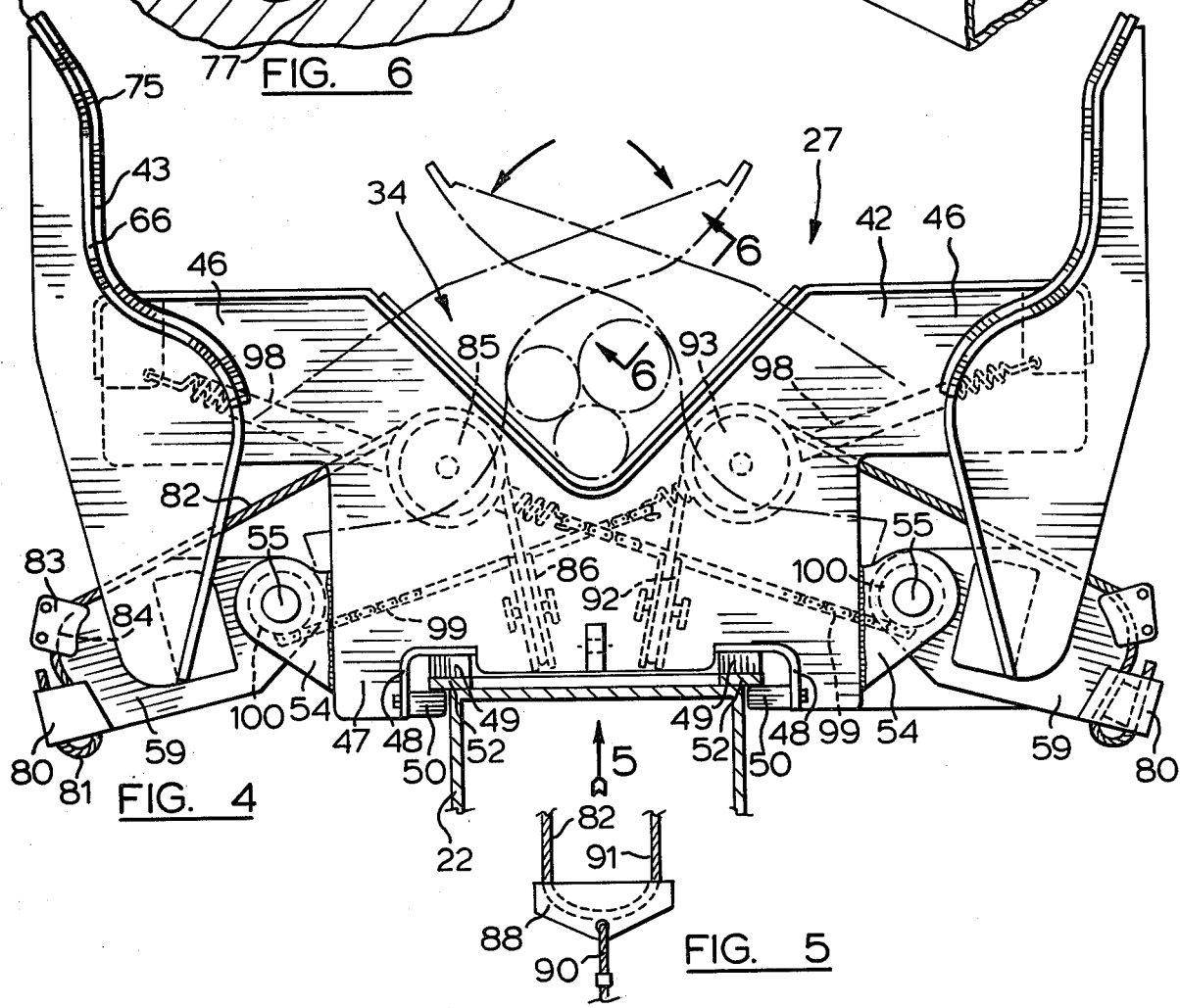

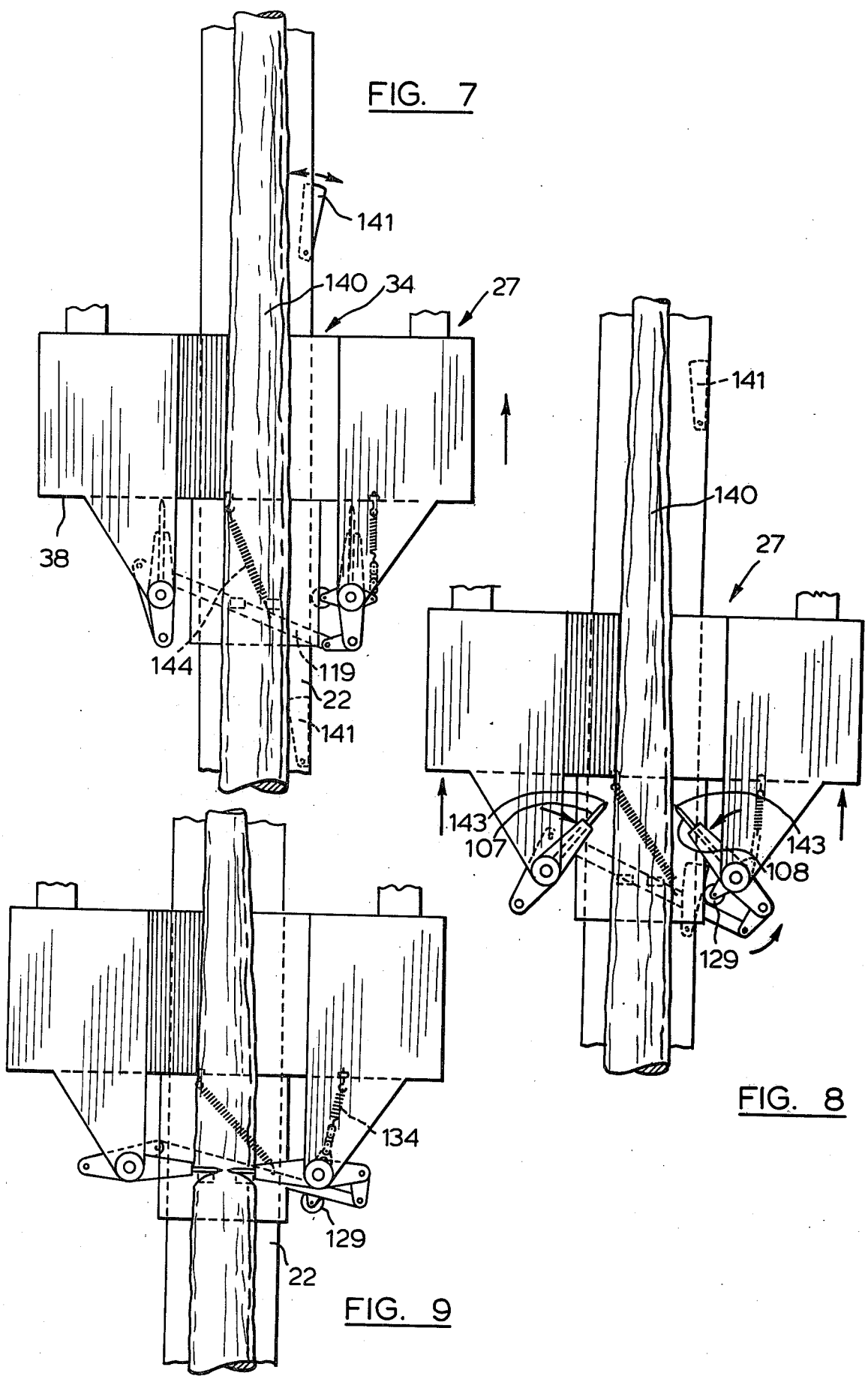

RAIL-RIDING LIMBER AND TOPPER

This invention relates generally to the felling, de-limbing and topping of trees in the forestry industry, and has to do particularly with improvements in a mobile vehicle which is adapted to fell, de-limb and top trees in a combined operation.

Numerous large vehicles have been developed by various manufacturers for use in the felling, de-limbing and topping of trees. Typically, such vehicles include a basic vehicular frame with large-diameter wheels and power means for driving the vehicle and the various components which it includes. Typically, such a vehicle includes a first articulating arm with grip means at the free end, adapted to grasp one or more trees (depending upon the size of the tree) near the lower end. The machine may also include means for felling the tree, although in many cases this is carried out as a separate operation. The machine under discussion further includes a rail which is pivoted to the main frame near one end of the rail, and which is adapted to extend away from the vehicle for a distance which is roughly the same as or slightly greater than the typical height of a tree. The angulation and orientation of the rail can be controlled from the vehicle. Riding on the rail is a carriage which includes de-limbing arms adapted to enclose one or more tree trunks that are placed in a central recess in the carriage. The tree or trees are held in a recess in the carriage and stationary with respect to the rail, extending parallel with the rail and adjacent thereto. Then, the carriage is made to run outwardly along the rail with the de-limbing arms cutting off the limbs or branches as the carriage moves. In the prior art, means may also be provided on the carriage for topping the tree or trees being operated upon.

This invention provides improvements primarily in the construction of the carriage and rail combination, in order to achieve improved de-limbing and topping operations.

Accordingly, this invention provides, in an apparatus for topping trees, the combination of:
a frame and an elongated rail supported at one end from said frame,
a carriage mounted on said rail for longitudinal movement therealong,
means for positively moving said carriage longitudinally of said rail in the forward direction away from said one end, and in the rearward direction toward said one end,
the carriage defining an upper longitudinal central recess in which at least one tree trunk can be positioned,
a pair of topping blades mounted to either side of said central recess, each blade pivoting about an axis substantially normal to the direction of carriage movement, between a first position in which the blade is out of interfering relationship with a tree or trees located in said central recess and a second position in which it extends at right-angles to the direction of carriage movement, the blades in said second positions being aligned and having blades being arranged to top trees held stationary with respect to the rail while the carriage moves in one of said forward and rearward directions, the blades in pivoting from the first toward the second position as the carriage is travelling in said one direction biting into a tree in said recess, the tree motion with respect to the carriage urging the blades further toward said second positions thereof, thereby causing the blades to cut through the tree,
and means for automatically pivoting the blades from their first toward their second positions when the carriage reaches a predetermined location along the rail, said means causing the blades to pivot at a rate such that the component of motion of the cutting edges parallel with the rail is smaller than the speed of the carriage with respect to the rail, whereby the biting of the blades into a tree causes the tree itself to continue the closing movement of the blades toward their second positions, thus relieving the said means from having to exert the force necessary to cut through the tree, said means having a first component fixed longitudinally with respect to the rail and a second component forming part of the carriage, whereby interaction between said components as the carriage reaches said predetermined location causes the pivoting of the blades, the means being such that, until the blades contact the tree, the pivoting rate is dependent solely upon the instantaneous speed of the carriage with respect to the rail.

One embodiment of this invention is illustrated in the accompanying drawings, in which like numerals denote like parts throughout the several views, and in which:

FIG. 3 is a further perspective view of the carriage and a portion of the rail upon which it rides;

FIG. 4 is an end view of the carriage shown in FIGS. 2 and 3, with certain of the internal structure shown in broken lines;

FIG. 5 is a view of one component of the FIG. 4 carriage, seen from underneath;

FIG. 6 is a sectional view through a portion of a tree showing the cutting action of the limbing arms of the carriage;

FIGS. 7, 8 and 9 are plan views of the carriage at various stages of the topping operation;

Figure 1:
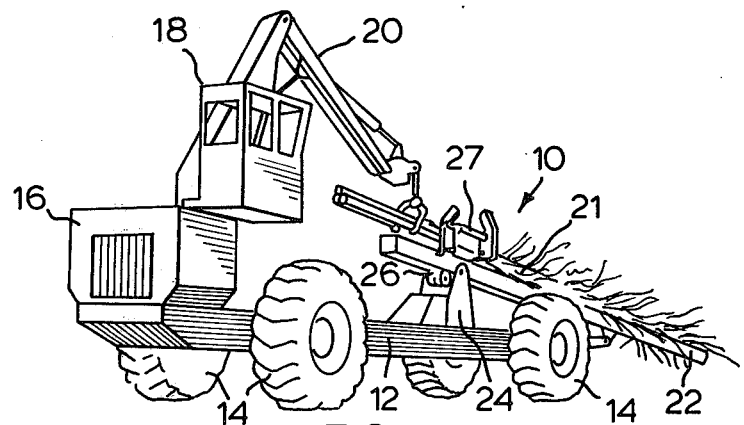
FIG. 1 is a perspective view of a vehicle to which the improvements of this invention may be applied.

Attention is firstly directed to FIG. 1, in which a vehicle 10 known in the trade as a limber is illustrated. (The words "limbing" and "de-limbing" tend to be used interchangeably in the art, as they both refer to the same operation, namely the removal of the limbs and branches of a tree.)

The vehicle 10 includes a vehicular frame 12, four deep-tread wheels 14, a power source 16 which typically would be a diesel engine, a control cab 18, an articulating arm 20 for handling and moving trees 21, an elongated rail 22, an upwardly projecting stanchion 24 from the frame 12 to which the rail 22 is pivoted at 26, and a limbing and topping carriage 27 riding on the upper side of the rail 22.

Means are provided for positively moving the carriage 27 longitudinally along the rail in what will be called the forward direction away from the pivot 26, and in the rearward direction toward the pivot 26. The forward direction is thus that in which the carriage moves upwardly along the trees as they are shown aligned in FIG. 1, this being the direction in which the de-limbing and topping operations almost always take place.

Figure 2:
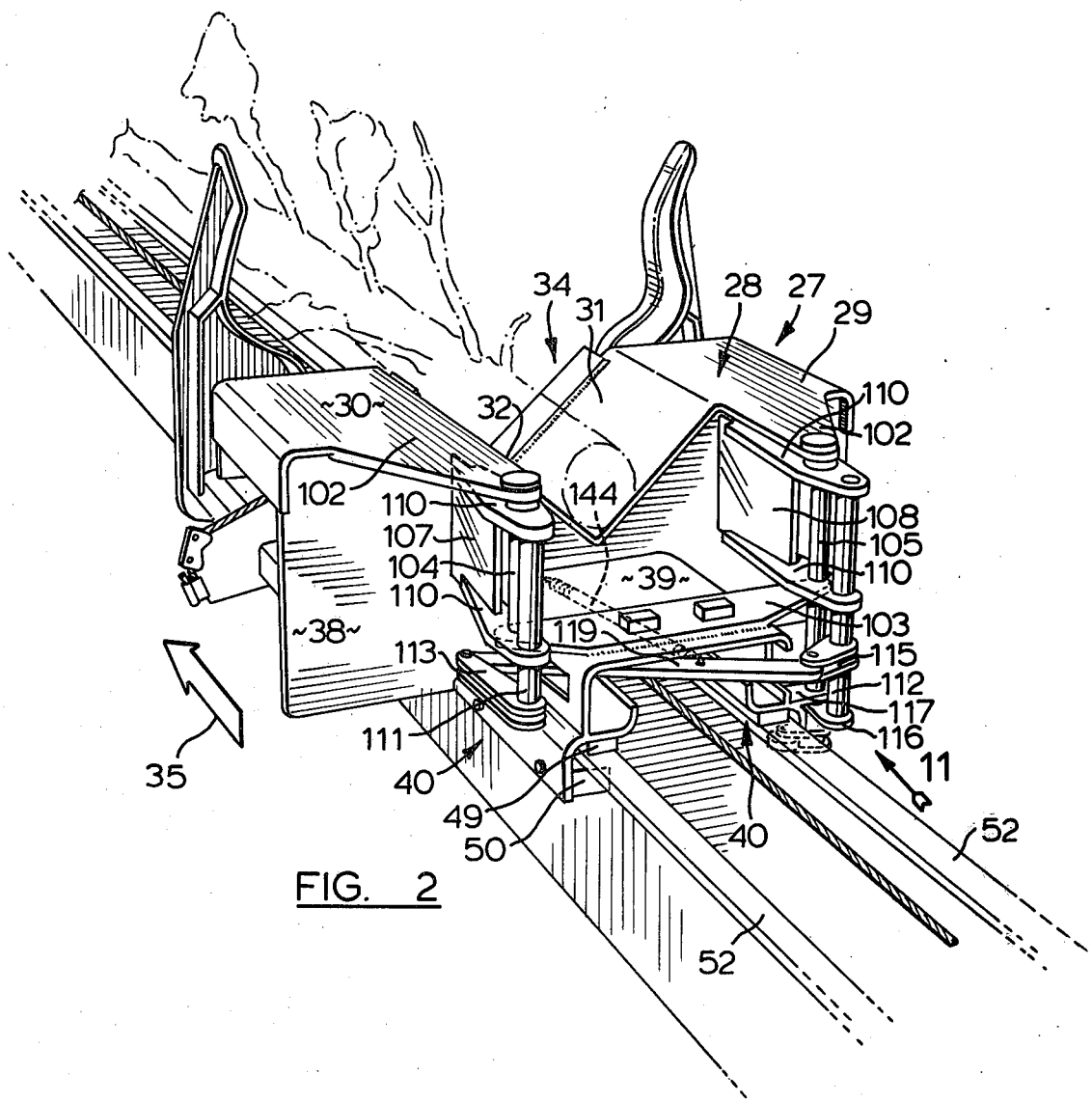
FIG. 2 is a perspective view, to a larger scale, of the carriage and a portion of the rail upon which the carriage rides.

As can been seen in FIG. 2, the carriage 27 has an upper wall 28 which defines two horizontal panels 29 and 30, and two angulated panels 31 and 32, which together define a V-shaped central recess 34. The recess 34 can be defined as being longitudinal, in the sense that its section is constant taken in the direction of the rail elongation. The arrow 35 in FIG. 2 shows what has been defined as the forward direction of movement of the carriage 27.

The carriage 27 further includes a rearward vertical panel 38 which provides structural strength and stability to the upper wall 28, a substantially horizontal rearwardly extending table portion 39 the purpose of which will later be explained more fully, downwardly depending structure 40 at either side of the table portion 39 which fills a number of tracking and strengthening functions, and a forward vertical panel 42, seen in FIG. 3, again provided essentially for structural strength. As best seen in FIG. 3, at the forward end of the V-shaped recess 34 is mounted a knife blade 43 which extends along both arms of the V of the recess, and which has a forward cutting edge 44. The cutting edge 44 is defined by the top surface of the blade 43 and a ground oblique surface which can be seen on the underside of the nearer of the two arms of the blade 43 in FIG. 3. Since the tree or trees will be riding on the upper side of the blade 43, this cutting edge configuration allows the blade 43 to "dig" inwardly as close as possible to the trunk of the tree when cutting limbs from the tree.

Turning now more particularly to FIGS. 3 and 4, the forward vertical panel 42 can be seen to define a T-shape in elevation, including outwardly projecting upper arms 46 and a stem portion 47. The stem portion at the bottom has welded to it two floor channels 48 which extend longitudinally in the sense of the rail elongation, and to which are secured nylon or other low-resistance riding blocks 49 and 50. The riding blocks 49 are located against the horizontal portion of the angle bars and carry the main weight of the carriage 27. The riding blocks 49 bear at the bottom against corresponding flange members 52 which are welded at the upper outer corners of the boom 22. The flange members 52 project outwardly of the side walls of the rail 22, and the riding blocks 50 extend beneath the outwardly projecting portions, as best seen in FIG. 4. Thus, the riding blocks 50 prevent the carriage 27 from being removed upwardly away from the rail 22. Also, the riding blocks 50 are adapted to loosely abut the upper portions of the side walls of the rail 22, thereby ensuring that the carriage 27 remains aligned longitudinally with the rail and does not shift laterally off the rail 22.

Turning briefly to FIG. 2, it will be understood that the downwardly depending structure identified by the numeral 40 is simply the extension at the rearward end of the floor channels 48 seen in FIG. 4. The riding blocks 49 and 50 can again be seen in FIG. 2.

Extending laterally outwardly from the stem portion 47 of the forward vertical panel 42 are brackets 54 to which shafts 55 are connected. The shafts 55 at the rearward end are affixed to appropriate structure on the inside of the rearward vertical panel 38. This structure has not been illustrated. The portions rotating about the shafts 55 are identical on either side of the carriage 27, and for the sake of clarity only that which is shown on the nearer side in FIG. 3 will be described in detail, it being understood that the configuration on the opposite side is a mirror-image of that to be described. A first plate 56 with a notch at 57 has a bearing 58 which receives the shafts 55 in such a way as to extend in a plane normal to the axis of the shaft 55. This is clearly illustrated in FIG. 3. A further plate 59 is also rotatably mounted about the shaft 55 at the other or forward end, and likewise extends in a plane normal to the axis of the shaft 55. The plate 59 extends further outwardly than does the plate 56, for a reason which will subsequently be explained.

A strut member 60 is welded at the rearward end to the plate 56 at a location spaced outwardly from the shaft 55. The strut member 60 extends through and is welded to the forward plate member 59 and projects beyond the forward plate member 59. At the forward end of the strut member 60 is mounted a de-limbing arm 62. The opposed de-limbing arm 63 shown in FIG. 3 is identical to but reversed from the de-limbing arm 62, however the arm 63 is disposed further forwardly than the arm 62, so that when they close toward the recess 34 they do not interfere.

Returning to the de-limbing arm 62, this includes a vertical plate member 64, and a curvilinear blade-defining member 65. The blade-defining member 65 is at all locations normal to the plane of the plate member 64.

The blade-defining member 65 includes a rectilinear portion 66 at the bottom in FIG. 3, an S-curved portion 67 which defines a concavity 68 that is situated with respect to the shaft 55 such that when the arm rotates in the clockwise sense as seen from forwardly of the carriage the concavity is juxtaposed with the recess 34 defined by the carriage proper. This is seen in broken lines in FIG. 5. Finally, the curvilinear blade-defining member 65 performs a slight reverse bend at 69 and terminates in a flat portion 70 bent slightly away from the concavity 68.

The blade-defining member 65 has, along its rearward edge 71, a knife edge 72 (FIG. 6) which is defined between the inside face 73 of the blade-defining member 65 and a ground oblique edge 74.

Secured against the forward margin of the blade-defining member 65 is a knife member 75 which is positioned in overlapping and offset relationship as best seen in FIG. 6. These two members are welded together. The blade member 75 also has a knife edge 76 which is defined between the inner face 77 of the blade member 75 and a ground oblique edge 78. The actual points of the cutting edges 72 and 76 are thus located as close to the tree as possible.

As best seen in FIG. 3, the blade member 75 extends only around the S-curved portion 67, and terminates at a location marked 79 on the illustration of the further arm in FIG. 3. Extending downwardly from this point is a forwardly projecting portion 80 of the arm. The forwardly projecting portion 80 provides a location at which the inner end of the blade member 75 may be welded for strength.

The de-limbing arms 62 are adapted to swing between a withdrawn position, which is that shown in solid lines in FIG. 4, and a de-limbing or inner position, which is that shown in broken lines in FIG. 4. As can best be seen in the latter figure, one or a plurality of trees located in the recess 34 are encompassed on all sides by cutting edges when the de-limbing arms 62 are in their inner position.

In order to swing arms 62 to the de-limbing or inner position shown in broken lines in FIG. 4, a tensioned cable arrangement is provided. In FIGS. 3 and 4, it can be seen that the forward plate member 59 for each de-limbing arm 62 supports, at its furthest outward margin, a clamp means 80 to which the end portion 81 of a cable 82 is secured, and a guide bracket 83. The guide bracket 83 keeps the cable 82 in tracking relationship around the curved edge 84 of the forward plate member 59.

The cable 82 passes over a freely rotating pulley 85 mounted within the body of the carriage 27, the pulley 85 having its axis of rotation parallel with the rail 22. The cable then passes over a further pulley 86 mounted within the body of the carriage 27, the further pulley 86 having its axis disposed transversely to the longitudinal extent of the rail 22, and its plane of rotation slightly angulated with respect to the vertical. From the further pulley 86, the cable passes forwardly into a yoke 88, as seen in FIG. 5, and is secured thereto. The cable is free to slide through a curvilinear passage in the yoke and emerges at the other side (shown in broken lines in FIG. 5). Thus, the yoke 88 has two cable portions extending forwardly from it, and single cable portion 90 extending rearwardly. The rightward portion of cable 82 seen in FIG. 5 passes around an internal pulley 92 which is the equivalent and mirror image of the pulley 86, thence around a pulley 93 which is the equivalent of the pulley 85, thence to the forward plate member 59 on the other or righthand side of the carriage, as seen in FIG. 4. The attachment of the far end of cable 91 to the forward plate member 59 on the right in FIG. 4 is identical to that on the left. The cable 90 thus extends away from the viewer in FIG. 4. In FIG. 3 it can be seen that there is located, at the lower central portion of the forward vertical panel 42 an eyelet 95 to which a towing cable 96 is attached. The reversely directed cable 90 can also be seen in FIG. 3 at far left.

The cables 96 and 90 each pass around pulleys at their respective ends of the rail 22, and then join one another on the underside of the rail. Thus, in effect, it is possible to consider the cable 96 and the cable 90 as being a single cable.

In order to cause the de-limbing arms 62 to move from their outward or solid-line positions in FIG. 4 to the inner or broken-line positions in the same figure, tension must be placed on the looped cable which includes the cables 90 and 96 shown in FIG. 3. This is typically done by causing the pulleys at the ends of the rail to move apart. It can be accomplished, of course, by having only one of the pulleys moveable longitudinally with respect to the rail, and the typical mode of force for such movement is applied by a hydraulic cylinder. This structure is known in the art, and need not be illustrated or described in greater detail in this specification.

Returning finally to FIG. 4, internal springs 98 connected to chains 99 are provided to produce torque on the de-limbing arm 62 which tends to open them out to their solid line positions in FIG. 4. This is accomplished by having the respective chains 99 pass around cylindrical surfaces 100 to which they are also connected, the cylindrical surfaces being concentric with the shafts 55. One of the cylindrical surfaces can be seen in solid lines in FIG. 3. A stop 101 is provided on the forward vertical panel 42 to abut the notch 57 of the plate 56 for each de-limbing arm, thus defining the withdrawn positions of the latter.

In operation, the de-limbing of a tree takes place with the carriage 27 moving in the forward direction, which would be the direction away from the viewer in FIG. 1. One or a plurality of trees are held by the articulating arm 20 in the position shown in FIG. 1, with the carriage 27 initially in the retracted position in which it is at the nearer end of the rail 22. The cable tightening procedure described above is then initiated to bring the de-limbing arms 62 into de-limbing position around the tree trunks, i.e. the position shown in broken lines in FIG. 4. Then, forward tension is applied to the forwardly extending cable 96 (FIG. 3) to move the carriage 27 at relatively high speed out to the far end of the rail 22. Tension continues to be maintained on the cable by virtue of the separation of the pulleys described earlier, while powered sheaves of known construction are used to pull forwardly on the portion 96 of cable.

As the cable moves to the far end of the rail 22 in FIG. 1, the cutting edge 76 of the de-limbing arms removes the limbs from the trees, as can be seen in FIG. 6. By having the blade member 75 offset inwardly from the blade-defining member 65, it is possible to obtain a limb-cut closer to the trunk of a tree than would normally be the case. The reason is as follows: during the cutting, the de-limbing arms 62 strive to remain as close as possible to the trunk of the trees, because of the tension on the cable. However, the tree trunks are somewhat irregular and tapered, particularly in the sense that the diameter of a tree trunk just above a major limb tends to be stepped down in size from that just below. By providing the offset illustrated in FIG. 6 between the members 75 and 65, the arms are permitted to move inwardly immediately after a limb has been cut, in order to catch the next limb again as close to the tree trunk as possible.

Turning now to the second area of improvement in the carriage 27, attention is directed to FIG. 2. As can be seen, the upper wall 28 of the carriage 27 provides two rearwardly extending portions 102 which cooperate with the two lateral end portions of a plate 103 welded to the table portion 39, to support the top and bottom ends of vertical shafts 104 and 105, the shaft 105 being on the far right as seen in FIG. 2. The shafts 104 and 105 provide vertical pivot axes about which two topping blades 107 and 108, respectively, are pivotally mounted. The blades 107 and 108 are secured at the top and at the bottom to frame members 110 which are directly pivoted to the shafts 104 and 105. The frame members 110 extend rearwardly from the shafts 104 and 105 and support respective further shafts 111 and 112, each of which extends downwardly below the lowermost of its respective frame members 110. The further shaft 111 is fixed securely with respect to its respective frame members 110, and it has at its lower end a horizontal radially extending bracket 113 which is firmly affixed to it. Thus, the blade 107, its associated frame members 110, the further shaft 111 and the bracket 113 all rotate as a unit about the shaft 104.

Referring to the topping blade 108 on the right of FIG. 2, the further shaft 112 associated with the blade 108 extends further downwardly than the counterpart shaft 111 on the left, and has firmly affixed to it a first radially extending bracket 115, and a second bracket 116 which extends to the bottom of the shaft 105. The bracket 116 is essentially to give support to the bottom end of the shaft 112. The shaft 105 also extends further downwardly than its counterpart 104 on the left, and it can be seen in FIG. 2 that there is provided a support bracket 117 which is welded to the right-hand structure 40. Thus, the right-hand topping blade 108, its associated frame members 110, the further shaft 112, and the bracket 115 and 116 all rotate together as a unit about the shaft 105. A connecting link 119 extends between the distal end of the bracket 115 and the distal end of the bracket 113. This is clearly seen in FIG. 2, and it can be visualized that as either blade pivots inwardly, a like pivoting of the other blade will be caused.

Figure 11:
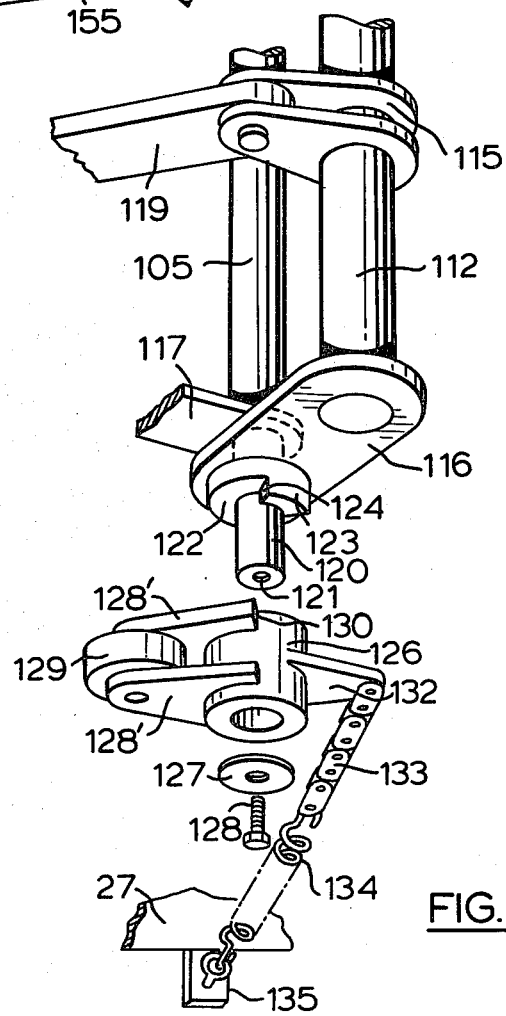
FIG. 11 is a telescoped perspective view of components on the carriage which function to trigger the topping mechanism.

The initial torque is applied to the right-hand blade 108 by a mechanism which is imperfectly seen in FIG. 2, but which is clearly illustrated in FIG. 11, to which attention is now directed.

The shaft 105 has a downward extension 120 of smaller diameter than the main portion of the shaft 105, and the extension 120 has a tapped bore 121 at its bottom end. The bracket 116 has welded to it a boss 122 having a downwardly extending portion 123 which defines an abutment face 124 the purpose of which will subsequently appear.

A cylindrical member 126 is provided, and is received on the portion 120 of the shaft 105 for free rotation with respect thereto. A washer 127 and a bolt 128 are utilized to secure the cylindrical member 126 in place. Extending outwardly from the cylindrical member 126 are two brackets 128' between which a cam follower wheel 129 is mounted for free rotation. The upper one of the brackets 128' defines an abutment face 130 which is adapted to come into contact with the abutment face 124 described earlier, upon counter-clockwise rotation of the cylindrical member 126 as seen from above. A further bracket 132 extends from the cylindrical member 126, to the end of which is attached an end of a chain 133, the other end of the chain 133 being attached to the end of a tension coil spring 134. The other end of the tension coil spring 134 is affixed to a portion 135 secured to the carriage 127.

Upon counter-clockwise rotation of the cylindrical member 126 as seen from above, which is caused by contact between the follower wheel 129 and a cam surface shortly to be described, the abutment face 130 comes into contact with the abutment face 124, and exerts a counterclockwise torque on all of the portions fixed with respect to the topping blade 108 as seen from above, thereby initiating the closing inward of the blade 108. This in turn causes the closing or pivoting inward of the other blade 107 due to the presence of the connecting link 119, and in effect the two blades 108 close together in tandem. When they are in the fully closed position, they extend toward each other in alignment, with their cutting edges closely juxtaposed.

Turning now to FIGS. 7, 8 and 9, the topping operation will be described with respect to a single tree.

In FIG. 7 the carriage 27 is moving forwardly in the direction shown by the arrow and a tree trunk 140 is being held stationary with respect to the rail 22 so that the de-limbing arms (not illustrated in FIG. 7) in combination with the knife edge at the forward edge of the recess 34 can strip the limbs from the tree.

Recessed in openings along one side of the rail 22 are a plurality of cam elements 141, which are adapted to be triggered in such a way as to move them from an inoperative position such as that illustrated at the bottom of FIG. 7, to an operative position such as that shown at the top in FIG. 7. Since the carriage 27 in FIG. 7 is moving upwardly in the sense of the drawing (forwardly), it will be understood that the cam follower wheel 129 described earlier with reference to FIG. 11 will come into contact with the forwardly and outwardly sloping surface of the cam element 141.

In FIG. 8 this contact has taken place, and the force exerted outwardly and rearwardly on the cam follower wheel 129 by the cam element is causing both of the topping blades 107 and 108 to pivot inwardly by virtue of the mechanism described earlier with reference to FIG. 2. The vertical cutting edges 143 of the topping blades 107 and 108 are almost at the point of contact with the tree 140 in FIG. 8. A slight further advance of the carriage 27 will cause such contact to take place, and when this happens, the cutting edges 143 will bite or "snag" into the tree. It is important that the mechanism involving the cam 141, the follower wheel 129 and the associated mechanism not be required to exert the force necessary to cut through and top the tree. It is desirable that the cam elements 141 be spring-loaded for reasons of safety, and furthermore it is not economical to provide the blade-closing mechanism with structural strength great enough to be able to force the blades through the tree simply by the action of the mechanism alone.

For this reason, it is provided herein that the means which causes the topping blades 107 and 108 to close toward their inner position should bring about pivoting of the blades at a rate such that the component of motion of the cutting edges 143 which is parallel with the rail be smaller than the speed of the carriage 27 with respect to the rail 22. This will mean that, as soon as the cutting edges 143 bite into the tree, the tree itself will take over the closing action and will continue the closing movement of the blades toward the inner positions. This will relieve the mechanical portions of the carriage from the necessity of having to exert the full force necessary to cut through the tree. It will be understood that the way to provide for this characteristic is to ensure that the slope defined by the cam elements 141 causes closure of the blades at a rate slow enough to result in this "snagging" action by which the tree itself takes over the closure.

FIG. 9 illustrates the closed position of the topping blades, and it will be seen that in the completely closed position, the follower wheel 129 is situated at a position well away from the rail 22, by virtue of the tension force in the spring 134.

Also well illustrated in FIGS. 7–9 is a further tension coil spring 144 which has one end attached to the connecting link 119, and the other end attached to a portion of the rearward vertical panel 38 of the carriage 27. The spring 144 exerts a force on the various components which tends to keep the topping blades 107 and 108 in the open position (that of FIG. 7) whenever they are not forced closed by a cam element 141.

Figure 10:
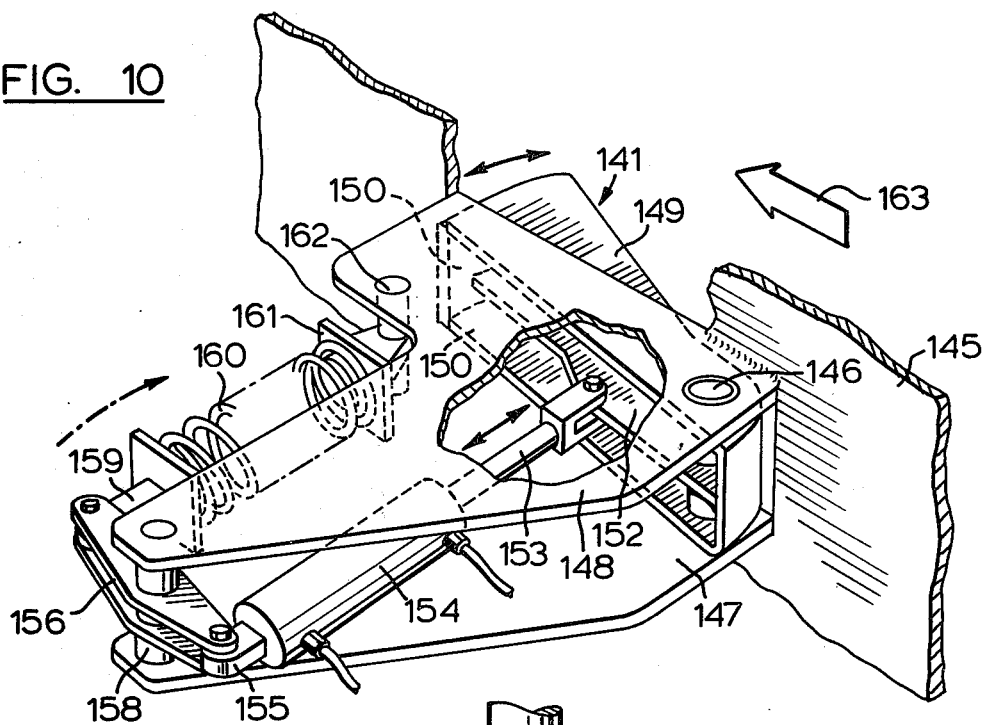
FIG. 10 is a partly broken-away perspective view of a cam assembly contained within the rail.

Attention is now directed to FIG. 10, in which the internal structure of the cam element 141 is illustrated. FIG. 10 is a view from inside the rail 22, with the broken-away plate 145 representing a portion of the side wall of the rail 22, through which the cam element 141 is adapted to project.

As has already been pointed out, the cam element 141 is selectively retractable and extensible to and from the side wall of the rail 22. As seen, the cam element 141 is an elongate member pivoted at the rightward end about a pivot shaft 146 which is mounted between two brackets 147 and 148 which extend horizontally in spaced apart relation within the rail and welded thereto. The cam element 141 is defined by a relatively flat cam surface on the outer side (not visible in FIG. 10), which is welded between two side pieces 149 and 150. The side pieces are large enough that they never extend wholly out of the recess in the rail 22, thereby to limit entry of small branches, dirt, etc. through the opening and into the interior of the rail 22. A further wall 150 is disposed at the forward end of the cam element 141. Centrally of the cam element 141 is a welded partition 152 to which is connected the end of the piston 153 of a hydraulic cylinder 154. The other end 155 of the hydraulic cylinder is pivoted to a rocker assembly 156 which in turn is pivoted about a shaft 158 fixed with respect to the bracket members 147 and 148. The far end of the rocker assembly 156 has pivoted to it a support member 159 to which one end of a compression coil spring 160 is affixed. The other end of the compression coil spring 160 is affixed to a further support member 161 which in turn is pivoted to a shaft 162 fixed with respect to the bracket members 147 and 148.

The compression coil spring 160 acts as a safety means to allow the cam member 141 to be forced into the rail 22 even when the hydraulic cylinder 154 is extended, should too great a force be exerted due to some accidental event. This protects the various elements associated with the cam mechanism.

The arrow 163 in FIG. 10 shows the forward direction of movement of the carriage.

Referring to FIG. 4, at the left, it will be seen that when tension is initially placed on cable 82 to rotate the delimbing arm 62 in the clockwise sense, the "arm" involved in the applied torque is relatively short (the arm being a perpendicular distance from the centre of the shaft 55 to the cable 82). However, as the de-limbing arm 62 begins to rotate in a clockwise sense as seen in FIG. 4, the configuration of the plate member 59 is such that it raises the cable 82 upwardly away from the shaft 55, thus lengthening the moment arm and thus increasing the torque being applied to the arm. When the arm comes down to the position in which it is in contact with the tree trunks (the broken line position in FIG. 4), the moment arm has approached its maximum length, and therefore a given tension in the cable 82 can produce a maximum downward pressure against the tree trunks.

I claim:

1. In an apparatus for topping trees, the combination of:
    a frame and an elongated rail supported at one end from said frame,
    a carriage mounted on said rail for longitudinal movement therealong,
    means for positively moving said carriage longitudinally of said rail in the forward direction away from said one end, and in the rearward direction toward said one end,
    the carriage defining an upper longitudinal central recess in which at least one tree trunk can be positioned,
    a pair of topping blades mounted to either side of said central recess, each blade pivoting about an axis substantially normal to the direction of carriage movement, between a first position in which the blade is out of interfering relationship with a tree or trees located in said central recess and a second position in which it extends at right-angles to the direction of carriage movement, the blades in said second positions being aligned and having cutting edges juxtaposed at about the mid-plane of the recess, means biasing the blades toward their first positions, the blades being arranged to top trees held stationary with respect to the rail while the carriage moves in one of said forward and rearward directions, the blades in pivoting from the first toward the second position as the carriage is travelling in said one direction biting into a tree in said recess, the tree motion with respect to the carriage urging the blades further toward said second positions thereof, thereby causing the blades to cut through the tree,
    and means for automatically pivoting the blades from their first toward their second positions when the carriage reaches a predetermined location along the rail, said means causing the blades to pivot at a rate such that the component of motion of the cutting edges parallel with the rail is smaller than the speed of the carriage with respect to the rail, whereby the biting of the blades into a tree causes the tree itself to continue the closing movement of the blades toward their second positions, thus relieving the said means from having to exert the force necessary to cut through the tree, said means having a first component fixed longitudinally with respect to the rail and a second component forming part of the carriage, whereby interaction between said components as the carriage reaches said predetermined location causes the pivoting of the blades, the means being such that, until the blades contact the tree, the pivoting rate is dependent solely upon the instantaneous speed of the carriage with respect to the rail.

2. The apparatus claimed in claim 1, in which the said means includes at least one cam element supported by said rail and constituting said first component, a follower wheel displaced from and pivoted about the axis of one of the topping blades, and a mechanism by which the follower wheel exerts closing force on both topping blades to move them from their first toward their second position, when the follower wheel rides on said cam element, said follower wheel and said mechanism constituting said second component.

3. The apparatus claimed in claim 2, in which the cam element is selectively retractable and extensible into and from a side wall of said rail, the follower wheel being mounted on an element having abutment contact with a portion fixed with respect to said one of the topping blades, the abutment contact allowing said element to positively rotate the said portion such that said one of the topping blades moves from its first toward its second position, but permitting faster such rotation of said one of the topping blades, as when the cutting edge of the blade bites into a tree during the movement from the first toward the second position.

4. The apparatus claimed in claim 3 in which said mechanism includes a connecting link between structure associated with the topping blades, in which the follower wheel is mounted on a bracket extending from said axis of one of the topping blades generally inward toward and perpendicular to the rail when the wheel is not contacting the cam element and the topping blades are in their first positions, any contact of the follower wheel with the cam element as the carriage is moving in said one direction for topping trees causing the bracket to pivot away from the direction of carriage movement with respect to the rail, thereby initiating movement of both topping blades from their first toward their second positions, and any contact of the follower wheel with the cam element as the carriage is moving opposite to said one direction causing the bracket to pivot in the other sense, such pivoting failing to effect movement of the topping blades.

5. The apparatus claimed in claim 4, in which the cam element is an elongate member pivoted at one end inside the rail and adapted to swing out through an opening in the side of the rail, there being provided extensible cylinder means for positively swinging the elongate member out through the opening and retracting it back through the opening, the cylinder means being attached at one end to the elongate member at a position spaced from the pivoted mounting on the rail, and being attached at the other end to a member resiliently maintained in a given position within the rail but able to be displaced from said given position upon exertion of a given displacement force.

* * * * *